2,975,061

COCOA-BUTTER SUBSTITUTES AND COMPOSITIONS CONTAINING SAME

Cornelis Johannes Soeters, Rotterdam, Netherlands, Hermann Pardun, Kleve, Germany, and Antony Crossley, Wallasey, and Stanley Paul, Prenton, Birkenhead, England, assignors to Lever Brothers Company, New York, N.Y., a corporation of Maine No Drawing. Filed Oct. 29, 1956, Ser. No. 618,681

Claims priority, application Great Britain Oct. 31, 1955

9 Claims. (Cl. 99—118)

This invention relates to cocoa-butter substitutes, to processes for preparing the same and to products containing them.

The main use of cocoa-butter is in chocolate. In the manufacture of good quality chocolate, the "nib," or decorticated cocoa bean, is ground and to it are added sugar, flavourings and additional cocoa-butter, together with milk powder in the case of milk chocolate. The amount of additional cocoa-butter depends upon the type of chocolate and is usually between 25% and 100% of the amount of cocoa-butter already present in the ground "nib." The cocoa-butter content of such chocolate is largely responsible for its physical characteristics; cocoa-butter is unusual among naturally-occurring fats in that it is normally a brittle solid to about 25° C., has a relatively narrow melting range and is almost completely liquid at 35° C.

Cocoa-butter is expensive and many attempts have been made to find a cheaper fat to substitute for at least part of the cocoa-butter which is added to the ground "nib." Attempts have been made to find a fat which can be used to make chocolate from partially defatted cocoa.

The present invention is based on the discovery that certain fractions obtained from lard can be used as substitutes for cocoa-butter in chocolate, and in other products in which cocoa-butter is normally used, for example, covertures for confectionery.

The present invention provides a process for preparing a cocoa-butter substitute which comprises fractionally crystallizing lard from a solvent to remove at least 60%, by weight of the lard, of the lowest melting glyceride fraction of the lard.

The present invention further comprises a method of preparing products in which cocoa-butter is normally incorporated, characterized in that cocoa-butter is replaced by a lard fraction having an iodine value within the range of about 25 to 45, and preferably 30 to 40, a softening point in the range of about 35 to 45° C. and a dilatation at 20° C. of not less than 1200.

More particularly the lard fractions should have a dilatation at 20° C. of not less than 1500, more preferably a dilatation at 20° C. of not less than 1800 and most preferably a dilatation at 20° C. of not less than 2000.

The actual value of the dilatation at 20° C. which the lard fractions to be used according to the invention should possess depends on the desired quality of the product and the degree of replacement of the cocoa-butter by the lard fraction.

When used to replace between 25 and 30% of the cocoa-butter in the final product, useful results can be obtained when the dilatation at 20° C. is not less than 1500. When even smaller proportions of the substitute are used, such as, for example, 10% of the lard fraction, useful results can be obtained when the dilatation at 20° C. is not less than 1400. Because of the relative cost of cocoa-butter and the substitute according to the present invention, a substitution of even 5% of the cocoa-butter by the lard fraction is useful.

Lard fractions having a softening point within the range 40 to 45° C. may commonly be used. The lower the proportion of the cocoa-butter substitute to be used in the final mixture, the higher the softening point may be within the range from 35 to 45° C.

The lard fractions can be mixed with cocoa-butter prior to incorporation in, for example, chocolate, and the invention accordingly includes mixtures of cocoa-butter and a lard fraction, which lard fraction has the characteristics set out above.

In order to obtain the specified fraction from lard, it is essential to remove from the latter a substantial low melting fraction. It is also preferable, but not always necessary in the case of fractions to be used in low proportions to cocoa-butter in the final product, to remove a high melting fraction. The yield of lard fraction having the specified properties appears to be between 20 and 30%. Roughly 60 to 80% of low-melting fractions have to be removed from the lard. The high melting fraction to be removed may be up to about 5%.

The fractionation of the fat may be carried out by crystallizing fractionally in the presence of a solvent. When only the lowest melting glycerides are to be removed a single crystallization may suffice, but it may be advantageous to carry out the removal in two or more crystallizations; similarly, when the highest and lowest melting glycerides are to be removed two or more crystallizations can be used. In the following description of fractionation procedure, substantially anhydrous acetone is used as the solvent but the invention is not limited in this way, as solvents other than acetone may be used, e.g. ether and light petroleum.

In order to remove the lowest melting glycerides in a single crystallization, an amount of acetone between 3 and 10 mls. per gm. of fat can be used. The larger the number of crystallizations or washes, the lower will be the ratio of acetone to fat that can be used. The temperature of crystallization depends on the conditions used, and with a single crystallization, a temperature of from $-3°$ C. to about $+10°$ C. may be used.

Various cooling procedures may be used. The lard may be dissolved in acetone at 25° C. or higher and then the solution cooled to the desired temperature. The solution may be allowed to cool undisturbed, but the time required is shortened considerably (20 to 30 minutes instead of many hours) if it is stirred throughout. Cooling may also be effected by distilling off part of the solvent under reduced pressure. An alternative procedure is to mix cold acetone with hot lard, the temperature of these being such that the mixture is at the desired crystallization temperature.

All crystallizations are preferably left at the crystallization temperature until no further precipitation takes place. The precipitate may then be filtered off, preferably with the application of vacuum, and then washed, either on or after removal from the filter, with chilled acetone at a temperature 1 to 2° lower than the crystallization temperature.

An alternative procedure which has been found particularly satisfactory is to draw off the mother liquor and washing liquids instead of filtering. In order to obtain crystals in a suitable form for this procedure, the lard-in-acetone solution should be above 40° C. before cooling commences and gentle stirring should be carried out throughout cooling. Under these conditions the crystals settle rapidly and the mother liquor can be drawn off. The degree of removal of the lowest melting glycerides from the solid crystals will depend on the number of washes, but normally 4 to 8 will be sufficient. After each wash the acetone is drawn off, and the acetone used in washing can conveniently be used for the crystallization of the next batch of lard. The drawing off process may be combined with that of filtration to separate liquid from the crystals.

The removal of the highest melting glycerides may be carried out by means of similar techniques.

The ratio of acetone to oil will be preferably in the range of 5 to 20 mls. per gm. of fat and the crystallization temperature in the range of 20 to 30° C. This can be carried out before or after the removal of the lowest melting glycerides, and may likewise be carried out as two or more separate crystallizations.

It has been found that the usefulness of the lard fractions specified can be increased by mixing them with a palm oil fraction having an iodine value not exceeding 42, a softening point in the range of about 30° C. to 45° C., preferably not more than 43° C., and a dilatation at 20° C. of not less than 1000. Preferably, the palm oil fraction has an iodine value of 30 to 36, a softening point in the range of about 30° C. to 40° C., preferably not more than 38° C. and a dilatation at 20° C. of not less than 1600 and preferably not less than 1700. These palm oil fractions and the preparation thereof are described in our copending application Ser. No. 565,758, filed February 15, 1956, and now abandoned.

Mixtures of lard and palm oil fraction are particularly useful as complete substitutes for cocoa-butter in chocolate manufacture. The mixture of lard fraction and palm oil fraction should preferably consist of 25% to 60% of palm oil fraction and 75% to 40% of lard fraction. In such a mixture, the lard fraction should preferably have an iodine value of 30 to 40 and a dilatation at 20° C. of not less than 2000. The mixtures of lard fractions and palm oil fractions may be obtained by fractionating a mixture of lard and palm oil.

It has also been found that the usefulness of the lard fractions specified may also be increased by mixing them with a mutton or beef tallow fraction having an iodine value within the range of about 28 to 40, preferably 28 to 35, and more particularly 28 to 33, a softening point in the range of about 30 to 45° C. and preferably not higher than 40° C., and a dilatation at 20° C. of not less than 1200 and preferably not less than 1400.

Again, the usefulness of the lard fractions may be improved by mixing them with both the above-mentioned palm oil fractions and the mutton and/or beef tallow fractions.

For determination of dilatations for the purpose of this specification, there are used a method and apparatus similar to those given in Section C–IV. 3e (52) of the "D.G.F. Einheitsmethoden," published by the Deutsche Gesellschaft für Fettwissenschaft e.V.

In order to stabilize the lard fraction before taking the dilatation, special measures are required.

In the melting of fats a characteristic change of volume is observed which, especially in the case of fats solid at normal temperature, manifests itself in a sudden increase in the volume.

The dilatation or isothermal melting expansion of a fat is the volume increase, which is expressed in mm.$^3$, determined under the conditions of the following procedure and referred to 25 g., the reference temperature being given.

The dilatometer is of glass and consists of a vertical graduated capillary tube joined at its lower end by a U-shaped capillary tube to a glass bulb surmounted by a neck which is internally ground to take a hollow ground glass stopper. The height (above the lowest point of the U-shaped capillary) of the top of the graduated tube and the top of the mouth of the bulb are 350 mm. and 70 mm., respectively. The graduations extend over a length of 250 to 290 mm., and start 1 cm. from the upper end of the tube. The graduations are marked in intervals of 5 mm.$^3$ (accurately calibrated) and cover a total volume of 900 mm.$^3$. The internal diameter of the bulb is 20 mm. and it has a volume of 7 ml. (tolerance ±0.5 ml.). The internally ground neck of the bulb tapers downward from an internal diameter of 15 mm. to an internal diameter of 12 mm. and is 26 mm. long. The bulb of the instrument is thus below the level of the graduations on the capillary tubing. The stopper to be inserted in the mouth of the bulb is about 95 mm. in length (including the ground portion), and is hollow and is partly filled with lead shot to hold it firmly in position while a dilatation is being determined.

1.5 ml. of well boiled distilled water containing a little blue ink is pipetted into the bulb of the dilatometer. The dilatometer is then weighed. A sample of the fat to be examined is thoroughly de-gassed by heating at 100° C. under vacuum. The fat (at about 60° C.) is then poured into the bulb of the dilatometer and the ground glass stopper is inserted, care being taken not to include any air. The amount of fat added is such that, during the determination, the level of water never falls below the lowest of the graduations and never rises above the top of the graduations. If the initial water level on filling is about two-thirds of the height of the graduated capillary, these conditions are usually fulfilled. The dilatometer is re-weighed to obtain the weight of the fat added. The hollow stopper is then partly filled with lead shot. It is then placed in a water bath maintained at 60° C. (±0.1°) and a reading of the level of the water in the capillary is made. This is the "base reading," $R_{60}$.

The filled dilatometer is chilled in an ice water bath for 1½ hours. It is then allowed to warm in an air bath to 26° C. at which temperature it is maintained for 40 hours. It is then again chilled in an ice water bath for 1½ hours and then placed in a water bath at 20° C. (±0.1° C.), the dilatometer being immersed to such a depth that the water level is above the middle of the ground glass stopper.

The position of the water meniscus in the capillary is read every half hour until two successive readings differ by no more than 2 mm.$^3$. The final reading ($R_t$) is used in the calculations.

A similar procedure is adopted for each temperature $t$ at which the dilatation is required. Thus $R_{20}$, $R_{25}$, $R_{30}$ and $R_{35}$ are successively determined.

Finally the dilatometer is heated again to 60° C. and the "base reading" is re-determined. If the initial and final "base reading" differ by more than 2 mm.$^3$ the whole operation must be repeated.

The calculation:

The value of the dilatation is calculated from the following formula:

$$D_t = \frac{25(R_{60} - R_t)}{W} - A$$

where $D_t$ = dilatation at $t°$ C.
W = weight of fat taken
$R_{60}$ = base reading (mm.$^3$)
$R_t$ = reading of the capillary at $t°$ C. (mm.$^3$), and
A is given in the table below:

| $t°$ C. | A |
|---|---|
| 20 | 880 |
| 25 | 770 |
| 30 | 665 |
| 35 | 555 |

The softening point is determined after stabilizing the fat by a modification of the method published by Barnicoat in "The Analyst" 69, pages 176–178. In this modified method 0.5 ml. of mercury is placed in a lipped 6 x 1 cm. test tube and the tube and contents chilled for 5 minutes in crushed ice and water. 1 ml. of fat melted at 100° C. is poured onto the mercury and the filled tube allowed to stand in ice and water for 90 minutes. A ⅛-inch diameter ball bearing is placed in the depression in the fat surface which forms when the fat is cooled. The fat in the tube is then stabilized in the same manner as described for the dilatometer, allowing the temperature to rise gradually to 26° C. and keeping the temperature at 26° C. for 40 hours. The tube is then attached to a thermometer graduated in one-tenths of a degree so that the fat column is on a level with the thermometer bulb. This is conveniently done by attaching a metal plate to the thermometer, the plate having several holes in which a tube or tubes may be suspended by the lip or lips. The thermometer and tube or tubes are immersed in a water bath equipped for stirring so that the tube or tubes are immersed to a depth of 4.5 cms. The determination is commenced with the water bath at 20° C., at which temperature it is maintained for 20 minutes. The temperature of the water bath is then raised at the rate of 0.5° C. per minute while stirring vigorously. The temperature when the steel ball has fallen half way through the fat column is recorded as the softening point.

All references in this specification to softening points and dilatations are to be construed as measured by the methods described above.

The following examples illustrate the invention or the manufacture of fractions to be used according to the invention.

Example 1

(a) 300 g. of lard of I.V. 65.7 were mixed with 1½ litres of acetone and the mixture warmed to 40° C. The solution was then cooled to 4° C. over ½ hour, the solution being stirred with a glass rod. It was allowed to stand at this temperature for ¼ hour and was then filtered through a chilled Büchner funnel with vacuum. The cake was pressed with a glass plunger and washed on the filter with 200 ml. of acetone at 3° C. The cake was then removed from the filter and stirred for 10 minutes with 500 ml. acetone at 3° C. to form a smooth slurry which was allowed to settle for 5 minutes. It was then filtered through a cooled Büchner funnel, the cake pressed and washed on the filter with 200 ml. acetone at 3° C. Residual acetone was removed from the cake by distillation under vacuum. The yield was 83 g. of a fraction having an I.V. of 31.6.

(b) To 80 g. of the product of stage (a) were added 400 ml. of acetone and the mixture warmed to 45° C. The solution was cooled to 19° C. while being stirred with a glass rod, and allowed to stand at this temperature for ½ hour with occasional stirring. It was then filtered through a Büchner funnel, pressed, and washed with 200 ml. of acetone at 19° C. The cake was removed from the filter and the residual acetone distilled off under vacuum. The yield was 52.8 g. of a product which was recrystallized as described in (c) below.

The filtrate and wash liquor from this crystallization were combined and the acetone removed by distillation under vacuum. The yield was 27.2 g. of a product having an I.V. of 38.5 and having the characteristics given in the table below.

(c) 50 g. of the more solid product from (b) were recrystallized and filtered in a similar manner to that described under (b) but using a crystallization temperature of 26° C. After removal of the acetone from the combined filtrate and washings, 38.8 g. of a product having an I.V. of 25.0 was obtained.

The dilatations and Barnicoat softening points of the products from (b) and (c) are given below.

| | Barnicoat softening point (° C.) | $D_{20}$ |
|---|---|---|
| Lard fraction I.V. 38.5 | 37.0 | 2,050 |
| Lard fraction I.V. 25.0 | 43.2 | 2,245 |

Example 2

(a) 800 g. of lard of I.V. 67.0 were dissolved in 3200 ml. of acetone, and the mixture warmed to 40° C. The solution was then cooled to −2° C. over 1 hour while being gently stirred with a glass rod. It was allowed to stand at this temperature for 15 minutes when 2600 ml. of solution were removed by syphoning. The wet crystals were then stirred with 1½ litres of acetone, cooled to −2° C., allowed to settle, and the washing liquor syphoned off. Three further washes were carried out in a similar manner but using 1 litre portions of acetone. The crystals were filtered through a cooled Büchner funnel, pressed, removed and stirred 10 minutes with 1 litre of acetone at −2° C. to form a smooth slurry which was allowed to settle for 5 minutes. It was then filtered and pressed on a cooled Büchner funnel. The bulk of the acetone remaining in the cake was removed by distillation.

(b) To the product of (a) which contained a little acetone was added 1600 ml. of fresh acetone and the mixture was warmed to 45° C. The resultant solution was cooled to 22° C. while being gently stirred with a glass rod, and allowed to stand at this temperature for ½ hour with occasional stirring. It was then filtered through a Büchner funnel, pressed and washed with 400 ml. of acetone at 22° C. The filtrate and wash liquor were combined and the acetone removed by distillation under vacuum. The yield was 192 g. of a product having an I.V. of 33.0. The dilatation of this lard fraction at 20° C. was 2295 and its Barnicoat softening point 40.7° C.

Example 3

(a) 800 g. of lard of I.V. 65.7 were mixed with 3 litres of acetone and the mixture warmed to 40° C. The solution was then cooled to +3° C. while being gently stirred with a glass rod. It was allowed to stand at this temperature for 15 minutes when 2140 ml. of mother liquor were removed by syphoning. The wet crystals were then stirred with 1 litre of acetone, cooled to 0° C., allowed to settle, and the washed liquor syphoned off. Eight further washes were carried out in a similar manner.

(b) The final crystal mass from (a) was melted and made up to a volume of 1250 ml. by the addition of a further quantity of acetone and this mixture was warmed to 45° C. The resultant solution was cooled to 24° C. while being gently stirred with a glass rod and allowed to stand at this temperature for ½ hour with occasional stirring. It was then filtered through a Büchner funnel and washed with 400 ml. of acetone at 24° C. The filtrate and wash liquor were combined and the acetone removed by distillation under vacuum. The yield was 140 g. of a product having an I.V. of 31.2. The dilatation of this lard fraction at 20° C. was 2300 and its Barnicoat softening point 40.6° C.

Example 4

Samples of "plain" chocolate were made, using the following formulae:

(a)

400 g. plain "refiner paste"
21 g. additional cocoa-butter
45 g. lard fraction I.V. 34.9, $D_{20}$ 2125, Barnicoat softening point 40.0° C.

(b)

88 g. fat-free cocoa powder
200 g. sugar
89 g. lard fraction I.V. 34.9, $D_{20}$ 2125, Barnicoat softening point 40.0° C.
89 g. palm oil fraction I.V. 31.9, $D_{20}$ 1800, Barnicoat softening point 33.1° C.

Both the lard and palm oil fractions had been refined, bleached and deodorized before use.

The fat in Formula *a* contained 1 part lard fraction to 3 parts of cocoa-butter. The fat in Formula *b* contained 1 part of lard fraction to 1 part of palm oil fraction.

The samples had an appearance, taste, melting and texture characteristics in the mouth which were substantially identical with chocolate prepared with natural cocoa-butter and on breaking the samples manually, they fractured, giving a characteristic "snap." The samples were also of the same satisfactory degree of hardness at normal temperatures (16–22° C.).

At elevated temperatures (e.g. 25° C.) the samples made from Formula *a* were slightly softer than the samples made from Formula *b*.

*Example 5*

(a) 300 g. of lard of I.V. 55.4 was mixed with 750 ml. of acetone and the mixture warmed until a clear solution was obtained. This solution was cooled overnight at 10° C. without stirring. Then it was filtered through a cooled Büchner funnel with vacuum. The cake was pressed with a glass plunger and washed on the filter with 150 cc. of acetone at 10° C. Residual acetone was removed from the cake by distillation under vacuum. The yield was 150 g.

(b) To 150 g. of the product of stage (a) were added 500 ml. of acetone and the mixture warmed until a clear solution was obtained. This solution was cooled in two hours under constant stirring to 25° C. and was then filtered through a Büchner funnel, pressed and washed with 150 cc. acetone at 25° C. A crystalline fraction of 45 g. was removed from the solution in this way.

(c) The filtrate from the crystallization of stage (b) was cooled overnight at 14° C. without stirring. Then it was filtered through a cooled Büchner funnel under vacuum, and the residue pressed and washed with 150 cc. acetone at 14° C. After removal of the acetone from the solid residue by distillation under vacuum, 75 g. of a product having an I.V. of 37.9, a Barnicoat softening point of 38° C. and $D_{20}$ of 2045 was obtained.

We claim:

1. A cocoa-butter composition consisting essentially of cocoa-butter and from 5 to 30% by weight, of a lard fraction having an iodine value within the range of 25 to 40, a softening point in the range of 35 to 45° C., and a dilatation at 20° C. of not less than 1200.

2. A cocoa-butter composition consisting essentially of cocoa-butter and from 5 to 30% by weight, of a lard fraction having an iodine value of from 30 to 40, a softening point within the range of 35 to 40° C., and a dilatation at 20° C. of not less than 2000.

3. A fat composition consisting essentially of a lard fraction having an iodine value within the range of 25 to 40, a softening point in the range of 35° to 45° C., and a dilatation at 20° C. of not less than 1200, and only one fat selected from the group consisting of cocoa-butter and a palm oil fraction having an iodine value not greater than 42, a softening point within the range of from about 30 to about 45° C., and a dilatation at 20° C. of not less than 1000, said cocoa-butter, when present in the composition, being at a level of from 70 to 95% by weight thereof, and said palm oil fraction, when present in the composition, being present at a level of about 25 to 60% by weight thereof.

4. A fat composition consisting essentially of a mixture of a lard fraction having an iodine value within the range of 25 to 40, a softening point in the range of 35° to 45° C., and a dilatation at 20° C. of not less than 1200, and a palm oil fraction having an iodine value not greater than 42, a softening point of from about 30 to about 45° C., and a dilatation at 20° C. of not less than 1000, said palm oil fraction comprising from about 25% to about 60% by weight of the mixture.

5. A chocolate composition consisting essentially of the non-fat constituents of decorticated cocoa bean, sugar, and a mixture of fats consisting essentially of a lard fraction having an iodine value of 25 to 40, a softening point of 35° to 45° C., and a dilatation at 20° C. of not less than 1200, and only one fat selected from the group consisting of cocoa-butter and a palm oil fraction having an iodine value not greater than 42, a softening point within the range of from 30 to 45° C., and a dilatation at 20° C. of not less than 1000, said cocoa-butter, when present in the composition, being at a level of from 70 to 95% by weight thereof, and said palm oil fraction, when present in the composition, being at a level of from about 25 to 60% by weight thereof.

6. The chocolate composition of claim 5, wherein the fat mixture additionally contains a minor amount of milk fat.

7. A chocolate composition consisting essentially of the non-fat constituents of decorticated cocoa bean, sugar and a mixture of fats consisting essentially of cocoa-butter and a lard fraction having an iodine value ranging from 25 to 40, a softening point of from 35° to 45° C., and a dilatation at 20° C. of not less than 1200, said fraction being present in the mixture at a level of from 5% to 30% by weight of the mixture.

8. A chocolate composition consisting essentially of the non-fat constituents of decorticated cocoa bean, sugar and a mixture of fats consisting essentially of cocoa-butter and a lard fraction having an iodine value ranging from 30 to 40, a softening point within the range of 35° to 45° C., and a dilatation at 20° C. of not less than 2000, said fraction being present in the mixture at a level of from 5% to 30% by weight of the mixture.

9. A chocolate composition consisting essentially of the non-fat constituents of decorticated cocoa bean, sugar, milk fat, and a mixture of fats consisting essentially of cocoa-butter, and a lard fraction having an iodine value ranging from 30 to 40, a softening point in the range of 35° to 45° C., and a dilatation at 20° C. of not less than 1200, the milk fat being present in the fat phase in minor amounts, and said fraction being present in said mixture at a level of from 5% to 30% by weight of the mixture.

References Cited in the file of this patent

UNITED STATES PATENTS

| | | |
|---|---|---|
| 2,468,799 | Ziels | May 31, 1949 |
| 2,586,615 | Cross | Feb. 19, 1952 |

FOREIGN PATENTS

| | | |
|---|---|---|
| 590,916 | Great Britain | July 31, 1947 |

OTHER REFERENCES

Lord: "Everybody's Cook Book," copyright 1937, Harcourt, Brace and Company, New York, pp. 121 and 231.

Riemenschneider et al., "Oil and Soap," September 1946, pp. 276 to 282.

Jensen: "The Chemistry, Flavoring and Manufacture of Chocolate Confectionery and Cocoa" (2nd ed.), 1951, pp. 120 to 129 and 190 to 192.

Bailey: "Industrial Oil and Fat Products," 2nd ed., 1951, pp. 139–140.